United States Patent
Lee et al.

(10) Patent No.: US 8,467,443 B2
(45) Date of Patent: Jun. 18, 2013

(54) OBJECT PRIORITY ORDER COMPOSITOR FOR MPEG-4 PLAYER

(75) Inventors: Yun Ju Lee, Seongnam-si (KR); Seok Pil Lee, Seoul (KR)

(73) Assignee: Korea Electronics Technology Institute (KR)

( * ) Notice: Subject to any disclaimer, the term of this patent is extended or adjusted under 35 U.S.C. 154(b) by 625 days.

(21) Appl. No.: 11/095,531

(22) Filed: Apr. 1, 2005

(65) Prior Publication Data

US 2006/0222071 A1    Oct. 5, 2006

(51) Int. Cl.
*H04N 7/12* (2006.01)
(52) U.S. Cl.
USPC ............................. 375/240.01; 375/240.12
(58) Field of Classification Search
USPC ............... 375/240, 240.01, 240.12; 382/236, 382/253; 709/229; 345/543, 630
See application file for complete search history.

(56) References Cited

U.S. PATENT DOCUMENTS

| | | | | |
|---|---|---|---|---|
| 6,535,919 B1 * | 3/2003 | Inoue et al. | | 709/229 |
| 6,711,300 B2 * | 3/2004 | Fisher et al. | | 382/253 |
| 6,791,556 B1 * | 9/2004 | Laird | | 345/543 |
| 6,833,840 B2 * | 12/2004 | Lifshitz | | 345/630 |
| 7,106,906 B2 * | 9/2006 | Iwamura | | 382/236 |

* cited by examiner

*Primary Examiner* — Allen Wong
(74) *Attorney, Agent, or Firm* — McClure, Qualey & Rodack, LLP

(57) ABSTRACT

An object priority order compositor for an MPEG-4 player having a drawing node list generator including an object priority order register, a drawing node extractor, a field-node extractor, and an object priority order manager including an object rendering sequencer and an object instruction manager. The drawing node list generator makes a list by receiving a scene tree from a parser manager and extracting drawing nodes necessary for presentation on a screen from the scene tree by a depth first search. The object priority order manager handles insert, delete, and replace commands received from scene constitution information to determine priority order of an object. The object priority order compositor performs presentation of objects based on a priority order for objects when a scene change, in which an object is inserted, deleted, or replaced in real time by user interaction, as required in an MPEG-4 scene of high capacity multimedia objects.

9 Claims, 4 Drawing Sheets

OBJECT PRIORITY ORDER COMPOSITOR FOR MPEG-4 PLAYER

OBJECT OF THE INVENTION

Technical Field of the Invention and Background of the Related Art

The present invention relates to an object priority order compositor for an MPEG-4 player and, more particularly, to a drawing node list generator comprising an object priority order register, a drawing node extractor, and a field-node extractor, and an object priority order manager comprising an object rendering sequencer and an object instruction manager.

A compositor of an MPEG-4 player is a module to construct a list linked in order of node for presentation considering the present time and drawing space after receiving a scene tree, which is formed through MPEG-4 stream parsing by a parser. Among existing MPEG-4 players, a 2-dimensional MPEG-4 player of CSELT has have a compositor suitable for presentation of MPEG-4 scenes.

FIG. 1 is a schematic diagram of an MPEG-4 player having an object priority order compositor. The object priority order compositor determines sequence of presentation by assigning priority order on relevant media objects.

FIG. 2 is an example diagram to illustrate operation of a conventional 2-dimensional MPEG-4 player compositor of CSELT. Referring to FIG. 2, drawing nodes linked sequentially from a header represent video/audio/image/2D objects, which are presented on an audiovisual screen. Nodes connected to each drawing node are field nodes, which represent properties of a corresponding drawing node such as location, color tone, texture, etc. The compositor searches drawing nodes sequentially from the header and reads objects of drawing nodes and property values of the objects to make it possible presentation of objects suitable to an audiovisual screen.

Multimedia data has high capacity, so presenting a scene through combination of various media data and replacing presented media objects requires a lot of overhead. Accordingly, to combine various media objects for expression of a scene and replace each object, audiovisual media data has to be presented by an object unit and space-time information of the media data has to be able to be efficiently changed.

However, in case of a conventional compositor, for audiovisual scene presentation reflecting user interaction such as insert, delete and replace of object, all media objects have to be presented over again and, therefore, several problems such as blink of screen or low presentation speed may be caused.

Technical Problem

Accordingly, the present invention is directed to an object priority order compositor for an MPEG-4 player that substantially obviates one or more problems due to limitations and disadvantages of the related art. An object of the present invention is to provide an object priority order compositor for an MPEG-4 player, which can enhance a speed in audiovisual scene presentation by user interaction such as insert, delete and replace of object on an MPEG-4 player.

DETAILED DESCRIPTION OF THE INVENTION

The object of the present invention is achieved by an object priority order compositor for an MPEG-4 player comprising a drawing node list generator for making a list through receiving a scene tree from a parser manager and extracting drawing nodes necessary for presentation on a screen from the scene tree by means of depth first search; and an object priority order manager for handling insert, delete, and replace commands received from scene constitution information and determining priority order of an object.

An object priority order compositor in accordance with the present invention is an MPEG-4 player software module which can provide more efficient presentation when an audiovisual scene consisting of multimedia objects is changed by insert, delete and replace of object according to user interaction.

By assigning priority order to each media object and linking them, the object priority order compositor re-presents only the objects having an overlapping area or the objects having higher priority order than that of an inserted, deleted or replaced object when in an initial scene a user command event occurs to require a scene reconstitution.

In addition, object properties and presentation order can be freely changed through user interaction. Result embodied by the proposed object priority order compositor shows that immediate and natural presentation of MPEG-4 stream is possible.

Reference will now be made in detail to the preferred embodiments of the present invention, examples of which are illustrated in the accompanying drawings.

Figure 1:
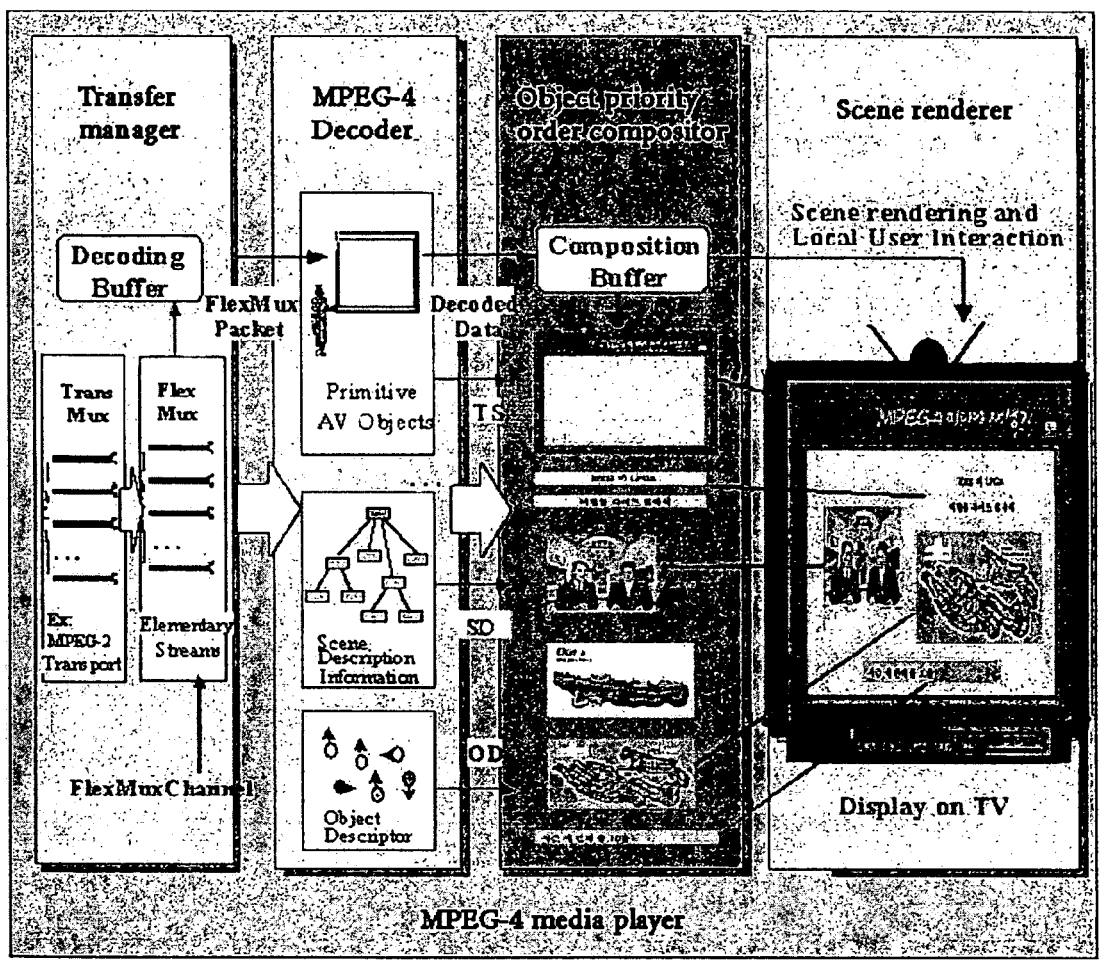
FIG. 1 is a schematic diagram of an MPEG-4 player having an object priority order compositor within.
Figure 2:
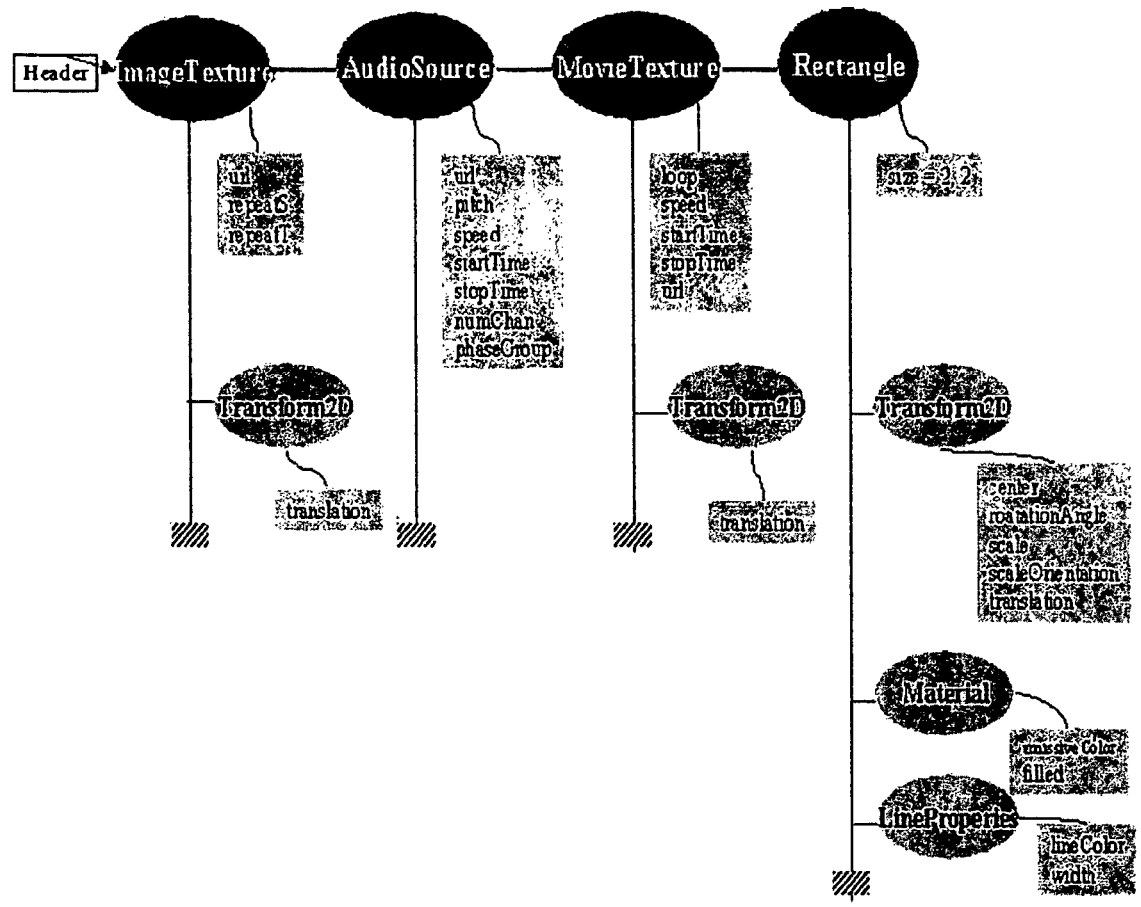
FIG. 2 is an example diagram to illustrate operation of a conventional 2-dimensional MPEG-4 player compositor of CSELT.
Figure 3:
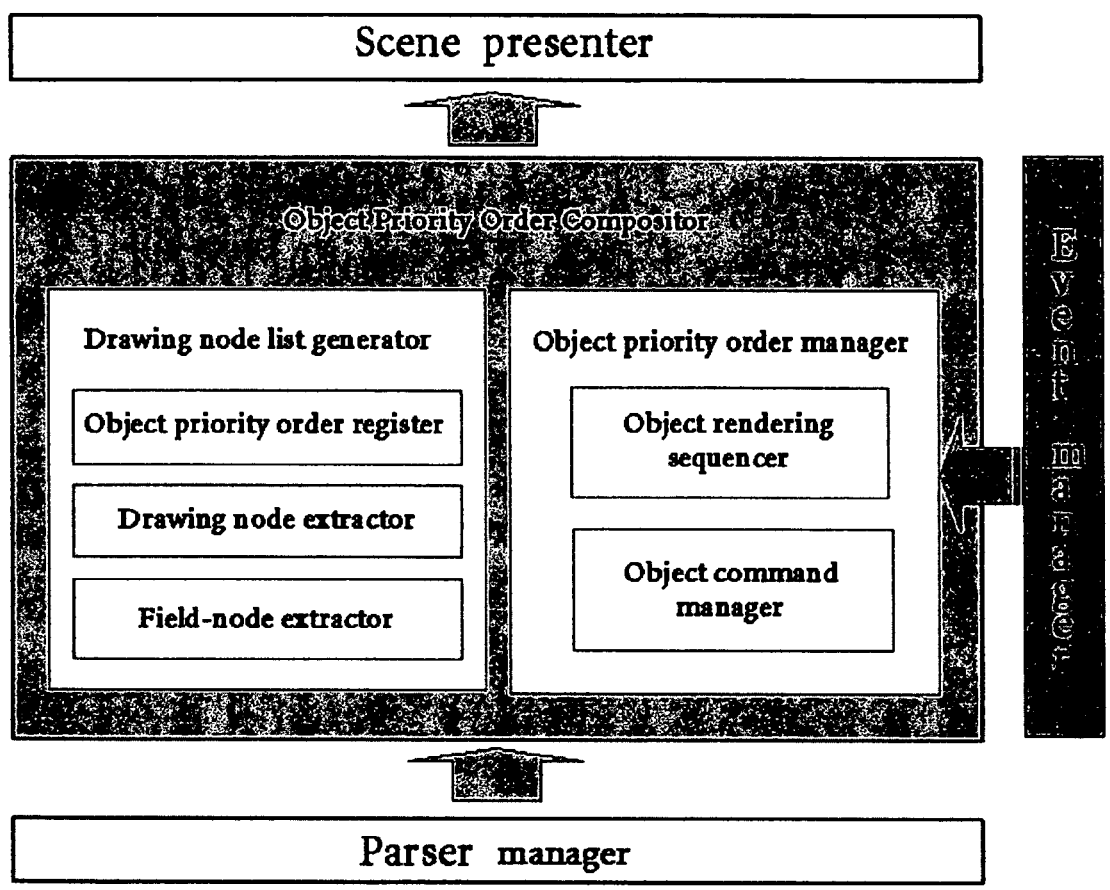
FIG. 3 is a schematic diagram of an object priority order compositor in accordance with the present invention.

FIG. 3 is a schematic diagram of an object priority order compositor in accordance with the present invention.

Referring to FIG. 3, an object priority order compositor comprises a drawing node list generator for making a list through receiving a scene tree from a parser manager and extracting drawing nodes necessary for presentation on a screen from the scene tree by means of depth first search; and an object priority order manager for handling insert, delete, and replace commands received from scene constitution information and determining priority order of an object.

The drawing node list generator comprises an object priority order register, a drawing node extractor and a field-node extractor. The object priority order register registers drawing priority order of objects on a head list of a drawing node list.

The drawing node extractor searches a scene tree after receiving a root node of the scene tree from a parser manager, and extracts and registers drawing nodes necessary for presentation. In the scene tree, all the nodes are classified into one of group node structures predetermined. To find a shape node composed of properties practically necessary for drawing, depth first search is performed for child nodes of the group nodes and drawing nodes are extracted.

The field-node extractor extracts nodes having a field, i.e., only field-nodes and registers the field-nodes on a sub-list of the drawing node list while searching nodes from the root node of the scene tree. Fields contain property information such as location of object, size of object, color tone of object, object fill, etc. Among nodes of a scene tree, the nodes necessary for presentation are drawing nodes and field-nodes having fields. Thus, by extracting only the drawing nodes and field-nodes and registering them on the drawing node list, presentation efficiency can be improved.

The object priority order manager comprises an object rendering sequencer and an object command manager. The object rendering sequencer determines object rendering order on a screen. In case of an initial scene, the object rendering order is identical with the drawing node list. In case of insert, delete, and replace commands which require reconstruction of scene, the object rendering order is adjusted.

Here, in case of 'insert', only the objects having higher priority than that of an inserted object are re-arranged according to priority order. In case of 'delete', after an object to be deleted is filled with a background color and is deleted from a dynamic object priority order compositor, objects having an overlapping area and objects having higher priority than that of the deleted object are re-arranged according to priority order. 'Replace' is achieved through combination of insert and delete events.

The object command manager uses insert, delete, and replace commands to constitute a dynamic scene. When the object command manager receives an insert, delete, or replace command from an event manager, it parses data to identify priority order of an object, and inserts, deletes, or replaces the object with the drawing node list.

In case of an insert command, data of an object to be inserted is parsed and priority order of the object is identified. Nodes constituting the object to be inserted are searched, and a head list and sub list of a drawing node list for the object are then formed. The object is inserted into a location corresponding to object priority order on the drawing node list.

In case of a delete command, data of an object to be deleted is parsed and priority order of the object is identified. Then, the object is deleted from the drawing node list.

In case of a replace command, data of an object to be replaced is parsed and priority order of the object is identified. By inserting and deleting corresponding objects with the drawing node list using insert command algorithm and delete command algorithm, object combination is changed.

Figure 4:
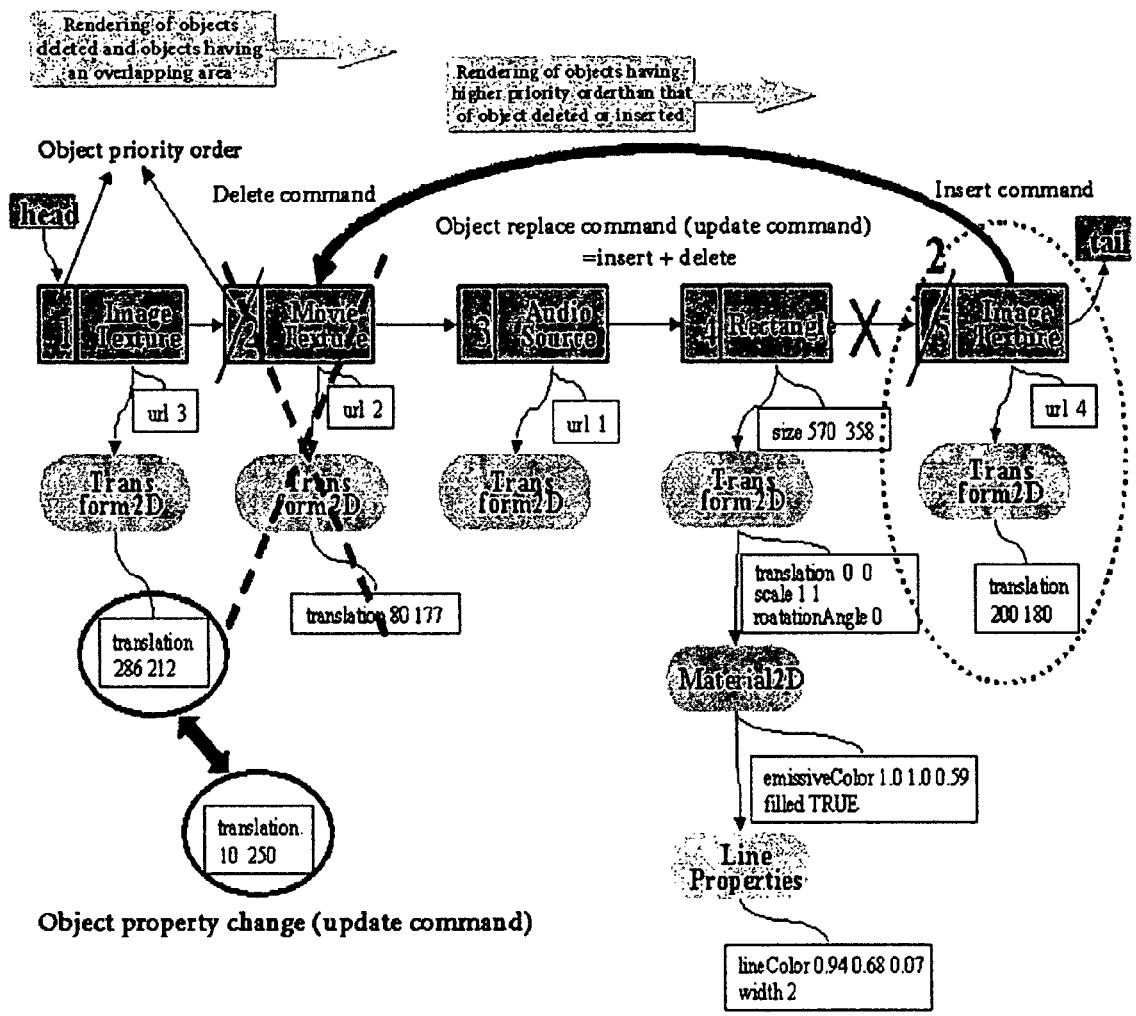
FIG. 4 is an example diagram to illustrate operation of an object priority order compositor in accordance with the present invention.

FIG. 4 is an example diagram to illustrate operation of an object priority order compositor in accordance with the present invention. Referring to FIG. 4, when there is an insert, delete, or replace command through user interaction, object priority order of a linked list is searched and a media object is inserted into or deleted from a corresponding location, or replaced with a corresponding media object.

In a presented scene, when a user commands insert of a particular object (video), the particular object is moved, for example, into a location of priority order 2. Then, object priority order is re-arranged in ascending order and objects are presented. Here, presentation speed can be improved because only the objects with higher priority than that of the inserted object among the whole objects are presented. Moreover, the scene construction is unrestricted because priority order of the inserted object can be arbitrarily adjusted.

When a user commands delete of a particular object (video), the object having, for example, priority order 2 is deleted and filled with a background color. Then, object priority order is re-arranged in ascending order. Here, the deleted object video does not need to be presented. Objects having lower priority order than that of the deleted object are examined about whether having an overlapping area. The objects having an overlapping area and the objects having higher priority order than that of the deleted object are presented in sequence. Accordingly, the presentation speed can be improved because only the objects having higher priority order than that of the deleted object and objects having an overlapping area are re-presented and, therefore, the number of objects to be presented decreases.

By assigning priority order to all objects to be presented using an MPEG-4 object priority order compositor, software developers and users can freely make a desired presentation scene through combination of objects.

EFFECT OF INVENTION

In an MPEG-4 audiovisual scene consisting of high capacity multimedia objects, when a scene change, which an object is inserted, deleted, or replaced in real time by user interaction, is required, the object priority order compositor for an MPEG-4 player according to the present invention performs presentation of objects based on priority order of objects. The compositor searches priority order of objects, and makes it possible to arbitrarily change order of objects and further to perform presentation of only objects requiring reconstruction. Thus, the object priority order compositor provides re-usability and availability of multimedia data. Further, the object priority order compositor renders efficient multimedia data processing possible by providing a user with a dynamic scene.

The invention claimed is:

1. An object priority order compositor for an MPEG-4 player, comprising:
    a drawing node list generator operative to make a list by receiving a scene tree from a parser manager and extracting drawing nodes necessary for presentation on a screen from the scene tree by a depth first search; and
    an object priority order manager operative to receive insert, delete, and replace commands from scene constitution information and determine a priority order reflecting spatial and temporal presentation information for objects corresponding to a command received from the scene constitution information,
    wherein the object priority order manager renders objects corresponding to the drawing nodes on the screen, and
    wherein the object priority order compositor again renders a subset of the objects corresponding to the drawing nodes on the screen, the subset of the objects consisting of objects having higher priority order than objects deleted and objects having an overlapping area with the objects corresponding to the command received from the scene constitution information, based on the priority order reflecting spatial and temporal presentation information such that presentation speed is increased by re-representing only the subset of the objects resulting in a decrease in a number of the objects to be presented.

2. The object priority order compositor as defined by claim 1, wherein the drawing node list generator comprises an object priority order register, a drawing node extractor, and a field-node extractor.

3. The object priority order compositor as defined by claim 2, wherein the object priority order register registers drawing priority order of objects on a head list of a drawing node list.

4. The object priority order compositor as defined by claim 2, wherein the drawing node extractor searches a scene tree after receiving a root node of the scene tree from a parser manager and extracts drawing nodes necessary for presentation.

5. The object priority order compositor as defined by claim 2, wherein the field node extractor extracts field-nodes and registers the field-nodes on a sub-list of a drawing node list while searching nodes from a root node of a scene tree.

6. The object priority order compositor as defined by claim 1, wherein the object priority order manager comprises an object rendering sequencer and an object command manager.

7. The objected priority order compositor as defined by claim 6, wherein the object rendering sequencer determines object rendering order on a screen.

8. The object priority order compositor as defined by claim 7, wherein in a case of an initial scene the object rendering sequencer sets the object rendering order identical with a drawing node list.

9. The object priority order compositor as defined by claim 7, wherein case of insert, delete, and replace commands which require reconstruction of scene, the object rendering sequencer adjusts the object rendering order.

* * * * *